(12) United States Patent
Murano

(10) Patent No.: US 6,455,138 B1
(45) Date of Patent: Sep. 24, 2002

(54) METALLIZED SHEETING, COMPOSITES, AND METHODS FOR THEIR FORMATION

(75) Inventor: Adam Murano, West Chesterfield, NH (US)

(73) Assignee: Textron System Corporation, Wilmington, MA (US)

( * ) Notice: Subject to any disclaimer, the term of this patent is extended or adjusted under 35 U.S.C. 154(b) by 0 days.

(21) Appl. No.: 09/223,545

(22) Filed: Dec. 30, 1998

Related U.S. Application Data

(60) Provisional application No. 60/070,166, filed on Dec. 31, 1997.

(51) Int. Cl.[7] .......................... B32B 3/10; B32B 15/08; B32B 27/32; B32B 27/36; B32B 27/40

(52) U.S. Cl. .................. 428/201; 428/195; 428/198; 428/206; 428/208; 428/209; 428/421; 428/422; 428/424.6; 428/425.8; 428/425.9; 428/447; 428/448; 428/450; 428/457; 428/458; 428/461; 428/462; 428/463; 428/474.4; 428/480; 428/483; 428/515; 428/516; 428/518; 428/520; 428/522; 428/523

(58) Field of Search ................................ 428/422, 421, 428/355 R, 355 EN, 355 N, 423.1, 424.2, 424.6, 424.8, 457, 425.8, 425.9, 461, 195, 201, 203, 204, 206, 208, 209

(56) References Cited

U.S. PATENT DOCUMENTS

| 3,118,781 A | | 1/1964 | Downing ................... 117/33.3 |
| 3,916,048 A | * | 10/1975 | Walles ......................... 428/35 |
| 4,101,698 A | | 7/1978 | Dunning et al. .............. 428/31 |
| 4,115,619 A | | 9/1978 | Kurfman et al. ............ 428/336 |
| 4,188,358 A | | 2/1980 | Withoos et al. ............. 264/255 |
| 4,211,822 A | | 7/1980 | Kurfman et al. ............ 428/412 |
| 4,215,170 A | | 7/1980 | Vilaprinyo ................... 428/328 |
| 4,403,004 A | | 9/1983 | Parker et al. .................. 428/31 |
| 4,407,871 A | | 10/1983 | Eisfeller ....................... 428/31 |
| 4,431,711 A | | 2/1984 | Eisfeller ....................... 428/31 |
| 4,503,189 A | * | 3/1985 | Igarashi et al. ............. 525/104 |
| 4,713,143 A | | 12/1987 | Eisfeller ..................... 156/655 |
| 5,174,434 A | | 12/1992 | Bourgoine ............. 198/803.01 |
| 5,198,272 A | | 3/1993 | Eisfeller ....................... 427/251 |
| 5,284,679 A | | 2/1994 | Eisfeller et al. ............ 427/240 |
| 5,290,625 A | | 3/1994 | Eisfeller et al. ............ 428/216 |
| 5,320,869 A | | 6/1994 | Eisfeller et al. ............ 427/250 |
| 5,384,161 A | | 1/1995 | Eisfeller et al. ............ 427/250 |
| 5,464,661 A | | 11/1995 | Lein et al. .................. 427/409 |
| 5,468,518 A | | 11/1995 | Lein et al. .................. 427/421 |

FOREIGN PATENT DOCUMENTS

| EP | 0358445 A2 | 3/1990 |
| EP | 0392082 A2 | 10/1990 |
| EP | 0616906 A2 | 9/1994 |
| WO | WO 96/33026 | 10/1996 |

* cited by examiner

*Primary Examiner*—Vivian Chen
(74) *Attorney, Agent, or Firm*—Hamilton, Brook, Smith & Reynolds, P.C.

(57) ABSTRACT

A metallized composite comprising a first thermoplastic layer, a discontinuous intermediate layer comprising discrete islands of metal in an adhesive, and a second thermoplastic layer. The metallized composites of the invention can be employed as reflective surfaces, such as are used as mirrors or substitutes for chrome trim on automobiles. A particularly preferred metal as a component of the discontinuous layer of the composite is indium.

36 Claims, 3 Drawing Sheets

METALLIZED SHEETING, COMPOSITES, AND METHODS FOR THEIR FORMATION

RELATED APPLICATION

This application claims priority to U.S. Provisional Application No. 60/070,166, filed Dec. 31, 1997, the contents of which are incorporated herein by reference in their entirety.

BACKGROUND OF THE INVENTION

Metallized polymer sheeting is now commonly employed as a substitute for decorative chrome parts, especially in the automotive industry. Typically, such metallized polymer sheeting includes a layer of metal disposed between two polymer sheets.

There are several problems, however, with many types of known metallized polymer sheets. For example, laminates typically include an electrically continuous metal layer sandwiched between two polymer sheets. Such materials are often subject to delamination consequent to poor binding between the metal layer and the polymer layers on either side. Further, corrosion of the metal layer, which is usually aluminum can spread between the polymer layers, thereby causing significant diminution in appearance.

One attempt to reduce the likelihood of delamination and loss of appearance resulting from corrosion of the metal layer has been to form a discontinuous metal layer on a polymer basecoat, such as a resinous urethane. A monomer top-coat, such as a solvent-based aliphatic urethane, is then deposited on the discontinuous metal layer, and subsequently polymerized to encapsulate metal islands of the discontinuous metal layer and to bond them to the polymer basecoat.

However, formations of metal islands on various types of polymers can be difficult. Also, bonding of a urethane top layer during polymerization to a polyurethane basecoat can be poor. One attempt to improve adhesion has been to etch the basecoat and discontinuous metal layer with a sodium hydroxide solution to remove residual metal between islands of the discontinuous metal layer. A limitation to this method is that etching can result in the formation of blackened areas in the metal layer, thereby detracting from the appearance of the resulting laminated part.

There are several other problems that can be associated with polymerizing a top layer in situ to form metallized polymeric sheeting. For example, polyurethanes, in particular, generally are not sufficiently hydrophobic to prevent weathering over extended periods of time and are easily attacked by sodium hydroxide and acids, such as nitric acid. Thicker layers of polyurethane top-coat are difficult to form because in situ polymerization can cause the resulting composite to appear irregular. In addition, evaporation of a solvent component during polymerization of urethanes can cause "popping" or bubbles to form, also diminishing the appearance of the finished product. Further, methods which employ deposition of a basecoat, such as a resinous urethane basecoat, require that the basecoat be applied to a substrate, from which the resulting metallized composite generally cannot be removed. Therefore, the utility of this method for forming various products, having different applications, is limited.

Therefore, a need exists for a metallized composite and a method for forming such a metallized composite that overcomes or minimizes the above-referenced problems.

SUMMARY OF THE INVENTION

The present invention is directed to a metallized sheeting, such as a formable metallized plastic sheet, and a composite. The invention is also directed to a method for forming the sheeting and composite.

In one embodiment, the invention is a formable metallized plastic sheet which, upon molding, does not cause degradation of reflectivity of the metal sheet.

In another embodiment, metallized composite includes a first thermoplastic layer and a discontinuous layer on the first layer. The discontinuous layer is formed of discrete islands of metal in an adhesive. A second thermoplastic layer is disposed over the discontinuous layer, whereby the discontinuous layer is between said first and second thermoplastic layers.

In still another embodiment, the metallized sheeting includes a continuous thermoplastic sheet and at least one discontinuous layer of metal within said thermoplastic sheet.

The method includes depositing a metal on a first thermoplastic layer to form a discontinuous layer of the metal. A second thermoplastic layer is laminated onto the discontinuous layer.

The present invention has several advantages. For example, neither thermoplastic layer of the composite is polymerized in situ. Rather, the thermoplastic layers are laminated together to sandwich the discontinuous layer of metal islands in an adhesive bedding. Consequently, a wider variety of polymers can be employed to form the composite, thereby enabling greater opportunity for improving specific qualities of the composite and for tailoring construction of the composite for specific uses. For example, the choice of polymerized web materials can be selected for improved formation of discrete metal islands, such as by combining a particular metal with a polymer web that minimizes residual metal between metal islands. Alternatively, a polymer web can be selected that is preferably suitable for specific methods of metal deposition. By minimizing the amount of metal that remains between metal islands of the discontinuous layer, the need for etching can be significantly reduced or eliminated.

Further, because a top polymeric layer is not formed in situ, greater thicknesses can be employed without diminishing the appearance of the finished product, thereby improving resistance to environmental use conditions, such as weathering. In some instances, a plasma of unsaturated monomers, such as acrylates or methacrylates, may need to be polymerized on indium in vacuo; in such instances, the top layer would be added in another operation. Also, evaporation of solvents during polymerization is eliminated, thereby preventing "popping" and other potential processing problems. Moreover, a wider variety of methods of forming the composite can be employed, such as by depositing metal islands first on a thermoplastic drum surface, and subsequently transferring the metal islands to a first continuous thermoplastic web. A second thermoplastic web can then be applied over the discontinuous layer to form the composite. In other embodiments, the first and second thermoplastic webs can be bonded to each other by melting, use of an adhesive, or by compression. All of these processing options provide potential sources for reducing the cost of production and increasing overall product quality and productivity.

Different polymers can be employed for the two thermoplastic sheets, thereby further broadening the utility of the composites of the invention. In addition, neither the first nor the second thermoplastic web is bound to a substrate. Consequently, composites of the invention can be made to be flexible. Specific applications of flexible reflectors or mirrors can include adjustable rear-view mirrors for use in automobiles and as substitutes for conventional chromeplated metal parts. In another embodiment, the composites can be molded after formation without degradation of the reflectivity of the discontinuous metal layer. Molding, such as embossing, for example, can provide an inexpensive means for incorporating a logo into flexible patches, such as can be applied to apparel, footwear, etc., that have the appearance of being perfectly reflective.

Other uses include in-mold decoration, blow molding and thermoforming. In-mold decoration, for example, includes injection molding a thermoplastic behind the sheet of composite to enable formation complex plastic art, such as parts having a reflective, mirror-like surface. The injection molding resin should be compatible with the first layer (the layer that will contact the molten injection molding resin). Preferably, the composition of the injection molding resin and the composition of the first layer of the composite will be the same; for example, injection molding a thermoplastic polyolefin (TPO) onto a composite which has as its first layer (facing the polymer melt) a TPO. Alternatively, the first thermoplastic layer and the injection molding resin should be compatible in the melt stage. An example of such a combination is a thermoplastic sheet of polycarbonate and an injection molding resin of polycarbonate-ABS blend.

Blow molding is similar to injection molding except that the molding resin is melted, extruded through a die and then blown with air or gas pressure against the walls of a mold cavity. In this case, a sheet of composite would be inserted into the mold and then the resin would be injected behind it.

In a thermoforming operation, the sheet is heated to soften it and then pushed into a cavity of a particular shape by a hot die surface. Vacuum forming is a similar process that also incorporates a vacuum to draw the softened sheet into the mold cavity as die pressure is applied to the opposite face.

DETAILED DESCRIPTION OF THE INVENTION

The features and other details of the apparatus and method of the invention will now be more particularly described with reference to the accompanying drawings and pointed out in the claims. It will be understood that the particular embodiments of the invention are shown by way of illustration and not as limitations of the invention. The principal features of this invention can be employed in various embodiments without departing from the scope of the invention. All parts and percentages are by weight unless otherwise specified.

The invention is directed to a formable metallized plastic sheet and a method for forming the metallized plastic sheet. The term "formable," as defined herein, includes, inter alia, suitability for in-mold decoration, blow molding, thermoforming, vacuum forming, etc. The formable metallized plastic sheet, upon molding, does not cause degradation of reflectivity of the metal sheet.

Figure 1:
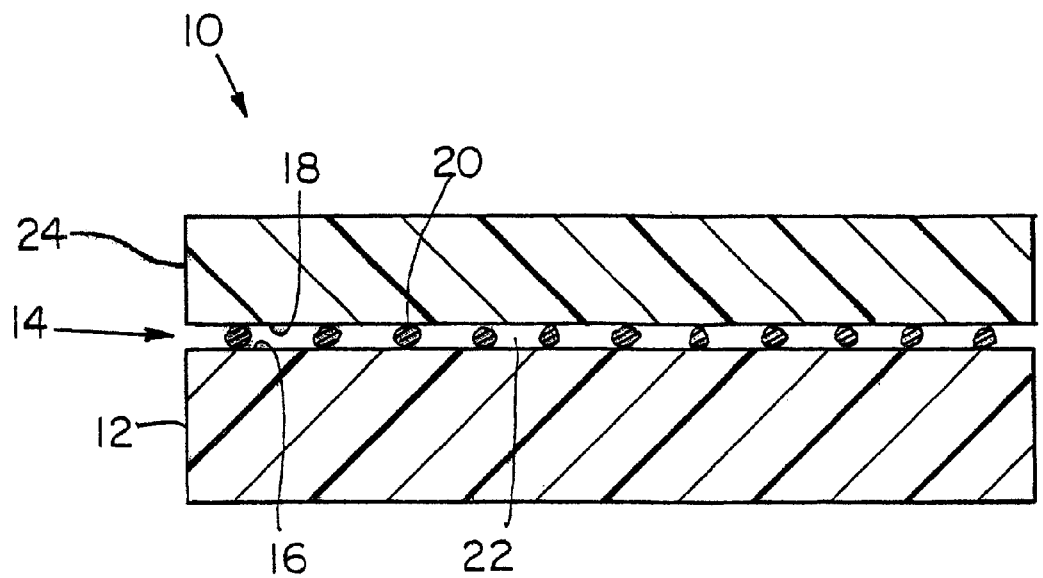
FIG. 1 is a cross-section of one embodiment of the composite of the invention, wherein first and second thermoplastic layers are bound together by an adhesive.

In one embodiment, shown in FIG. 1, metallized composite 10 includes first thermoplastic layer 12. Discontinuous layer 14 is on first thermoplastic layer 12 and includes first side 16 and second side 18. Discontinuous layer includes discrete islands of metal 20 and adhesive 22. Second thermoplastic layer 24 is on discontinuous layer 14, whereby discontinuous layer 14 is between the first and second thermoplastic layers. Discontinuous layer 14 preferably includes discrete specular islands of metal. Suitable metals, as defined herein, are those that can be deposited, or formed, on a suitable thermoplastic polymer. Examples of suitable metals include indium, zinc, tin, gallium, aluminum, cadmium, copper, nickel, cobalt, chromium, iron, gold, platinum, palladium, rhodium, etc. Preferably, the metal is indium. Also, preferably, discontinuous layer 14 is reflective; most preferably, discontinuous layer 14 has a mirror or mirror-like appearance. Optionally, discontinuous layer 14 can include specular islands of metal alloy. Examples of suitable alloys include stainless steel, nichrome, etc.

Examples of suitable adhesives of discontinuous layer 14 include at least one compound selected from the group consisting of styrene-butadiene copolymers, ethylene vinyl acetates, polyesters, polyamides, epoxies, acrylic pressure-sensitive adhesives, silicone pressure-sensitive adhesives, polyurethanes and isocyanate-cured polymers. The adhesive can be a thermally-activated adhesive.

In one specific embodiment, the adhesive includes two components. Preferred embodiments of adhesives that include at least two components include combinations of polyester, polychloroprene or polyurethane with isocyanate-functional crosslinkers, and a combination of water-based polyurethane dispersion with aziridine or with a water-dispersable isocyanate crosslinker. In another specific embodiment, the adhesive can be suitable for curing by exposure to ultraviolet light. An example of such an adhesive is ultraviolet light-curable pressure-sensitive adhesive.

First and second thermoplastic layers include at least one suitable thermoplastic polymer. These layers can also be formed of the same material, or they can be formed of different materials. A suitable thermoplastic polymer, as defined herein, is a thermoplastic polymer that effectively shields discontinuous layer 14 from environmental factors, such as weathering, humidity, and acidic or basic solutions encountered during ordinary intended final use of the composite. Examples of acidic and basic solutions include mild solutions of nitric acid or caustic. Specific examples of suitable thermoplastic polymers include, inter alia, polyethylene, polystyrene, polycarbonate, polyethylene terephthalate (PET), glycol-modified polyethylene terephthalate (PETG), polyvinylchloride (PVC), thermoplastic polyurethane (TPU), acrylonitrile butadiene styrene (ABS), polymethylmethacrylate, polypropylene, polyvinyl fluoride (PVF), TPO, polyethylene napthalate (PEN), polymethylpentene, polyimide, polyetherimide, polether ether ketone (PEEK), polysulfone, polyether sulfone, ethylene chlorotrifluoroethylene, cellulose acetate, cellulose acetate butyrate, plasticized polyvinyl chloride, polyester polycarbonate blends, ionomers (Surtyn), and co-extruded films or sheets of these thermoplastics, etc. The thermoplastic polymers can be elastomeric thermoplastics, and are commonly referred to as thermoplastic elastomers or TPE's. Examples include polyurethane (TPU), styrene-butadiene-styrene (SBS), styrene-ethylene-butadiene-styrene (SEEBS). Examples of opaque or translucent thermoplatics include polypropylene, polyamide, polyphenylene sulfide (PPS), styrene-maleic anhydride, polytetrafluoroethylene (PTFE), polycarbonate-ABS blends, polycarbonate polyester blends, modified polyphenylene oxide (PPO).

In one embodiment, first thermoplastic layer 12 predominantly includes a first thermoplastic polymer and a second thermoplastic layer 24 predominantly includes a second thermoplastic polymer. Examples of suitable combinations of first and second thermoplastic polymers are combinations of polyvinylidene difluoride (PVDF) and acrylonitrile butadiene styrene (ABS), PVDF/TPO, TPU/PVC, etc.

First thermoplastic layer 12 or second thermoplastic layer 24, or both, can be clear or tinted. Examples of suitable components for tinting continuous thermoplastic layers 12 and or 24 include suitable organic or inorganic dyes or pigments, etc. As an alternative to tinting the thermoplastic layer, the adhesive can be tinted. This has the advantage of being cheaper than adding colorant to plastic sheeting; moreover, the plastic sheeting can screen the colorant for exposure to ultraviolet light (UV), thus making it possible to use nonlight-fast colorants. In another embodiment, first thermoplastic layer 12 or second thermoplastic layer 24 can be opaque. Examples of suitable components that can cause opacity include carbon black, iron oxide, titanium dioxide, etc.

Metallized composite 10 can be embossed, such as by a conventional method, including, for example, heat pressing. As another option, metallized composite 10 can be formed, for example, to form a part that is to exhibit a translucence that is a multiple of the translucence of a single-ply of metallized composite. As another alternative, metallized composite 10 can be supported by a substrate, whereby metallized composite 10 is in contact with the substrate. Examples of suitable substrates include thermoplastic polyurethane, polyvinylchloride, glycol modified polyethylene, thermoplastic polyolefin, fiber reinforced nylon, fiberglass, aluminum, and metal alloys, such as steel, etc.

Figure 2:
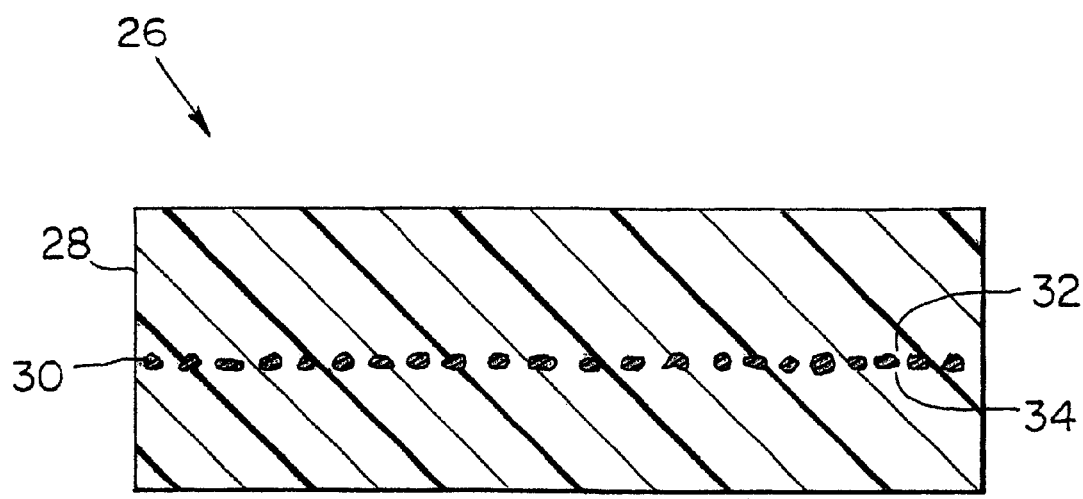
FIG. 2 is a cross-section of another embodiment of the composite of the invention, wherein a continuous thermoplastic layer encapsulates a discontinuous layer of metal.

In another embodiment, metallized composite 26, shown in FIG. 2, includes continuous thermoplastic sheet 28 that encapsulates discontinuous layer 30 of metal. The metal, or metals of discontinuous layer 30, and suitable thermoplastic polymers of continuous thermoplastic sheet 28 are the same as those described above with reference to FIG. 1.

As with the embodiments set forth above and shown in FIG. 1, metallized composite 26 of FIG. 2 can include one or more thermoplastic layers that are clear, tinted or opaque. Also, elastomeric thermoplastic composite can be supported by a substrate, formed or embossed. In one embodiment, discontinuous layer 30 substantially partitions thermoplastic sheet 28, whereby thermoplastic sheet 28 predominantly includes a first thermoplastic polymer at first side 32 of discontinuous layer 30, and predominantly includes a second thermoplastic polymer at second side 34 of discontinuous layer 30.

The method for forming a metallized composite of the invention generally includes depositing a metal on a first thermoplastic layer to form a discontinuous layer of the metal. A second thermoplastic layer is laminated onto the discontinuous layer. Suitable methods for deposition of metal on the first thermoplastic layer includes electron evaporation, sputtering, ion plating, induction heating, thermal evaporation, transfer of a preformed metal layer from a separate substrate, etc.

Optionally, the method includes bonding the first thermoplastic layer to the second elastomeric thermoplastic layer. Examples of suitable methods for bonding the thermoplastic layers include heating, to thereby cause the layers to melt combined and form a single, continuous thermoplastic layer. Alternatively, the layers can be bonded by heating without melting, pressing the layers together, or applying a suitable adhesive to the first and/or second thermoplastic layer before laminating the layers together.

In embodiments where an adhesive is employed that is curable by ultraviolet light, the method includes exposing the thermoplastic composite to ultraviolet light to thereby cure the adhesive. Alternatively, a UV-curable adhesive applied to one thermoplastic layer can be exposed to UV light and then laminated to a second thermoplastic layer.

Figure 3:
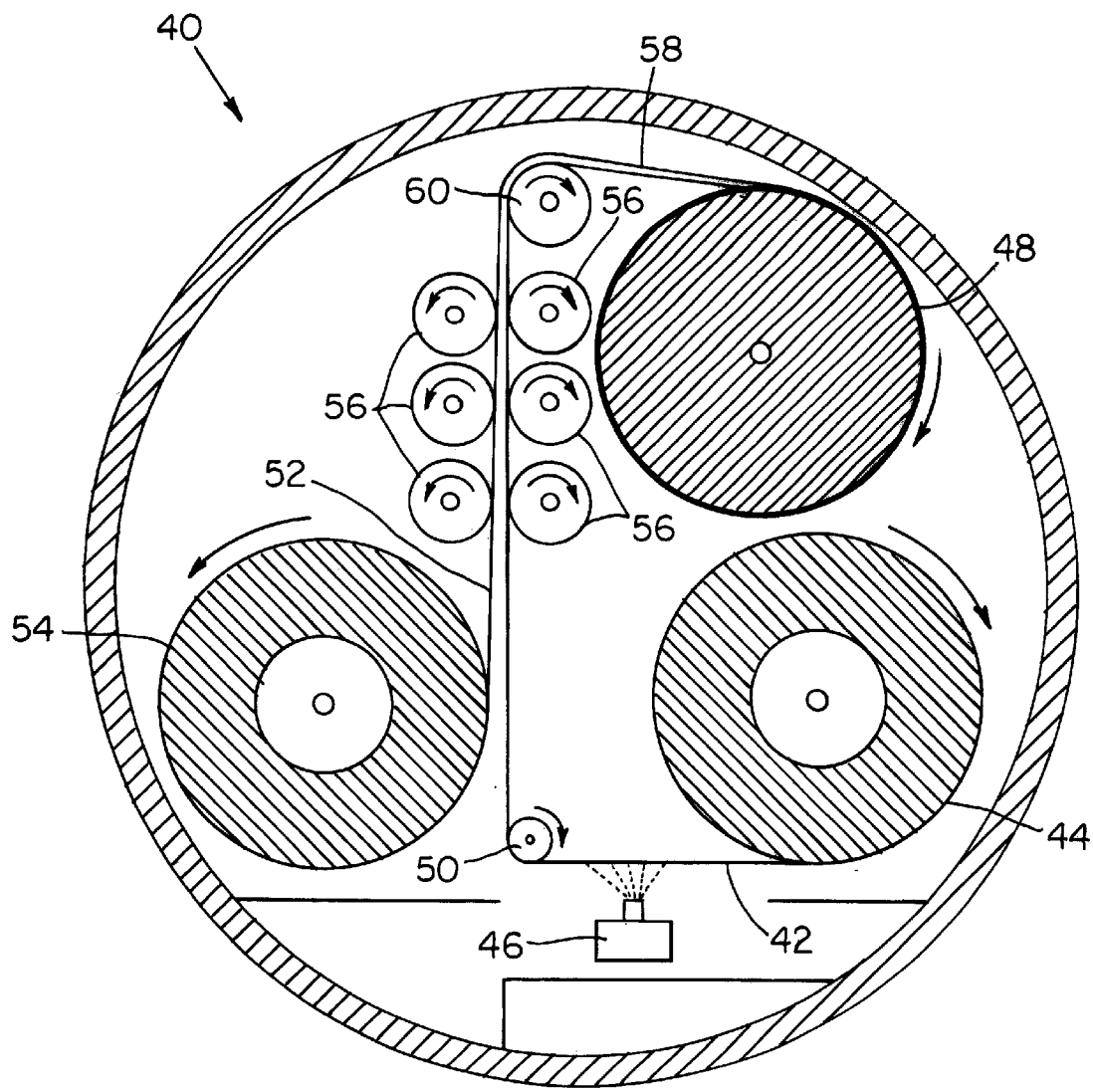
FIG. 3 is a schematic representation of one embodiment of apparatus suitable for forming a composite of the invention.

Conventional methods can be employed to conduct other optional steps, such as molding, folding, and/or embossing the metallized composite. In one embodiment, apparatus 40, shown in FIG. 3, is employed to conduct a method of the invention. Therein, first thermoplastic layer 42 is drawn from roll 44 across deposition guns 46 by reel 48. Deposition guns 44 deposit a suitable metal, such as indium on first thermoplastic layer 42. Deposited metal forms discrete islands on first thermoplastic layer 42, which then passes across roller 50. Preferably, roller 50 cools first thermoplastic web 42. Optionally, first elastomeric thermoplastic web 42 is coated with an adhesive deposited prior to or after deposition of specular islands of metal.

Second elastomeric thermoplastic layer 52 is drawn from roll 54 by reel 48. Optionally, second thermoplastic layer 52 is coated with an adhesive. First and second thermoplastic layers 42, 52 meet at rollers 56. In one embodiment, rollers 56 are heated. Preferably, in embodiments where rollers 56 are heated, they are heated to a temperature of about 300° F. First and second elastomeric thermoplastic layers 42, 52 become bonded to each other while passing through rollers 56, to thereby form a thermoplastic composite 58 of the invention. Thermoplastic composite 58 is drawn across roller 60 and then collected on reel 48.

Figure 4:
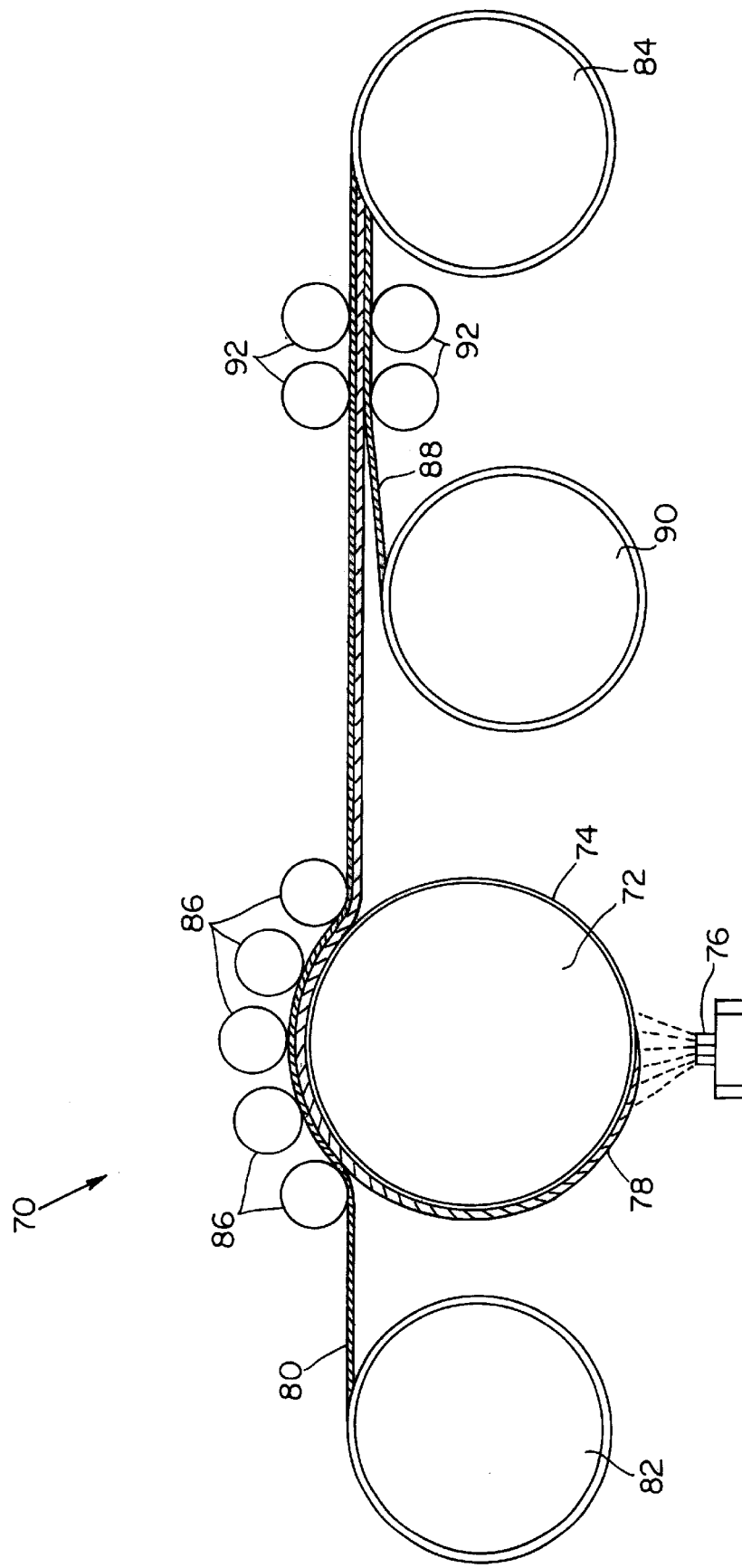
FIG. 4 is a schematic representation of an alternate apparatus for forming a composite of the invention.

In another embodiment, apparatus 70, shown in FIG. 4, is employed to conduct a method of the invention. In this embodiment, drum 72 includes a suitable thermoplastic coating 74. A suitable thermoplastic coating is one that will enable formation of discrete metal islands thereon by deposition, such as by electron beam evaporation, and which is suitable for transfer of metal islands to a first thermoplastic layer. An example of a suitable thermoplastic coating of drum is JPS 1880 Glossy 2® sheet stock material (urethane).

Drum 72 rotates, whereby metal plumes formed by deposition guns 76 cause deposition of the metal onto thermoplastic coating 74 of drum 72. As drum 72 rotates, discontinuous layer 78 of metal islands forms on thermoplastic coating 74 of drum 72.

First thermoplastic layer 80 is drawn from drum 82 by take-up reel 84. During conveyance from drum 82 to take-up reel 84, first thermoplastic layer 80 passes between rollers 86 and drum 72. Rollers 86 press first thermoplastic layer 80 against discontinuous layer 78 on drum 72, thereby transferring discontinuous layer 78 to thermoplastic layer 80. In one embodiment, rollers 86 are heated.

Second thermoplastic layer 88 is drawn from drum 90 by take-up reel 84. Optionally, an adhesive is deposited on second thermoplastic layer 88. First and second thermoplastic layers 80, 88 meet at rollers 92. Rollers 92 cause contact between first and second thermoplastic layers 80, 88. Preferably, rollers 92 are heated. Contact between first and second thermoplastic layers 80, 88 at rollers 92 causes formation of a thermoplastic composite of the invention. The thermoplastic composite is subsequently collected on take-up reel 84.

In another embodiment, indium is vacuum deposited on a first thermoplastic layer. The metallized sheet is removed from the vacuum chamber and laminated to a second thermoplastic layer or to the second thermoplastic layer with adhesive pre-applied, using conventional laminating methods employed in the coating/laminating industry. Alternatively, the deposited indium layer is coated in vacuo with a thin plasma-polymerized coating to protect the metallization.

In still another embodiment, an interleaf of plastic film, usually polyethylene or polyethylene terephthalate is wound with the indium metallization to protect the metal layer as it is rewound. It is subsequently stripped out as the metallized sheeting is coated or laminated.

In a further embodiment, the metallized sheeting is laminated to a film adhesive. A film adhesive consists of a layer of adhesive between two release liners. One liner at a time can be removed and the adhesive laminated to one thermoplastic sheeting. The second liner can then be removed and the laminate is adhered to the second thermoplastic layer.

The performance of the metallized composite can be further improved by overcoating or overlaminating additional layers of polymerized plastics or films over the composite to further improve abrasion resistance, chemical resistance, weathering resistance, etc. For example, a UV-curable hardcoat can be applied to the metallized composite and then cure the coating by exposure to high-intensity UV light.

The invention will now be further described by the following examples, which are not intended to be limiting in any way. All parts and percentages are by weight unless otherwise specified.

EXEMPLIFICATION

Example 1

A sample of A-4100® clear urethane sheet stock, made by Deerfield Urethane, A Bayer Company, South Deerfield, Mass., was metallized in a 72" metallizer (Part #EJWIN403MM30, made by Kurt J. Lesker Co., Inc., Clairton, Pa.). About 300 Å A of indium was deposited, through electron beam deposition, onto the surface of the urethane. A second sheet of A-4100® clear urethane sheet stock was removed from its polyester released liner backing and was gently pressed onto the surface of the indium. Special attention was given to removing air bubbles that might expand in the convection process. A heat gun was then utilized to heat the two samples. The conventional heat gun was set to a temperature of 400° F. and was held at a distance of approximately 4 inches from target. When exposed to the heat, the two identical sheets of material immediately showed signs of melting as the two materials appeared to be fused together. The indium layer slightly discolored during the convection heating. Samples of the same type were repeatedly run to attempt to maximize appearance. Finally, a convection oven set at a temperature of 300° F. was used to melt the materials together over a 4–5 minute duration. Slight iridescence persisted with the fusing process. Since the initial trials with the A-4100® clear urethane sheet stock, it was been determined that the metallized unprotected sheet appeared to have a finite shelf life, whereafter the sample will discolor, and eventually turn white with thermal application of the top film. In practice, it should be the intent of the designer to have the materials mated as soon as possible to prevent this occurrence.

Example 2

A sample of JPS 1880 Glossy 2® sheetstock material (urethane) was metallized in a 72" metallizer (Part #EJWIN403MM30, made by Kurt J. Lesker Co., Inc., Clairton, Pa.). About 300 Å of indium was deposited, through electron beam deposition, onto the surface of the urethane. A sample of the A-4100® clear urethane sheet stock, with the polyester release liner backing removed, was then gently applied to the surface of the indium. The sandwiched samples were then inserted into a 300° F. convection oven for a duration of 2 minutes. The samples were then removed from the oven and allowed to cool to the touch. The samples were then manually pulled apart by starting a separation at the edge. At this point it was noted that the indium had been effectively transferred to the A-4100® clear urethane sheet stock substrate. The indium surface maintained its superior reflective properties with no distortion evident. The sample of the JPS material was discarded, while a second sheet of A-4100® clear urethane sheet stock was thermally adhered to the first using the same process outlined above.

Example 3

Additional work was performed using an adhesive technique for application of the protective film. Two samples of sheet, JPS 1880 Glossy 2® sheet stock and 30 mil E-grade double polished PVC film were used. Both of the sheets generally had a transparent appearance, but the E-grade double polished PVC film material had a slight blue tint due to the resin's inherent nature. They were a metallized in a 72' metallizer (Part #EJWIN403MM30, made by Kurt J. Lesker Co., Inc., Clairton, Pa.). About 300 Å of indium was deposited, through electron beam deposition, onto the surface of the urethane. After metallization, an adhesive-backed film of PVC, KPMF® black, supplied through Kay Automotive Graphics, Inc. from KPMF, Inc., Wells, Okla., was carefully applied to the indium layers of each sample. The sample, when viewed through the JPS 1880 Glossy 2® sheet stock material or E-grade double polished PVC film material, exhibited a clear mirror-like appearance.

Example 4

A standard vacuum web metallizer was used to vacuum metallize continuous rolls of film with indium metal. Indium wire (0.070") from Arconium Corporation was continuously fed to heated ceramic boats. Highly reflective indium depositions were achieved using web speeds of 50 to 300 ft/minute.

1,100 linear feet of 40" wide 1-mil PET film was vacuum metallized at web speeds from 30 to 50-ft/minute. The indium wire feed rate averaged 28"/minute. This highly reflective, vacuum metallized film was then adhesively laminated to 6.5 mil PET film in a standard web coater-laminator to create a laminate with the indium layer between two PET films. The adhesive used was National Starch 3918 laminating adhesive modified with carbon black filler to provide an opaque backing to the indium layer. The adhesive was applied to the uncoated polyester film using a 165 quad gravure cylinder; web speed was 50 feet/minute. The adhesive coated film was then laminated in-line to the indium-coated film at a nip temperature of 130° F.

Samples of this laminate were then tested for lamination strength using an Instron tester. Initial bond values (obtained within 15 minutes of lamination) were 1.8–2.3 lbs./inch. Samples aged at room temperature for three days had lamination strengths of 2.4–2.5 lbs./inch.

EQUIVALENTS

Those skilled in the art will recognize, or be able to ascertain using no more than routine experimentation, many equivalents to the specific embodiments of the invention described specifically herein. Such equivalents are intended to be encompassed in the scope of the claims.

What is claimed is:

1. A metallized composite, comprising:
   a) a first thermoplastic layer;
   b) a discontinuous layer on said first layer, said discontinuous layer including discrete islands of metal in an adhesive; and
   c) a second thermoplastic layer, said discontinuous layer being between said first and second thermoplastic layers.

2. The metallized composite of claim 1, wherein said first and second thermoplastic layers are laminated together.

3. The metallized composite of claim 1, wherein at least one of the thermoplastic layers includes polyethylene terephthalate.

4. The metallized composite of claim 3, wherein the first and second thermoplastic layers includes polyethylene terephthalate.

5. The metallized composite of claim 1, wherein the second thermoplastic layer includes an ionomer.

6. The metallized composite of claim 1, wherein the second thermoplastic layer includes polyvinylfluoride.

7. The metallized composite of claim 1, wherein the second thermoplastic layer includes polyvinylidene dichloride.

8. The metallized composite of claim 1, wherein the first thermoplastic layer includes acrylonitrile butadiene styrene.

9. The metallized composite of claim 8, wherein the second thermoplastic layer includes polyvinylidene difluoride.

10. The metallized composite of claim 1, wherein the first thermoplastic layer includes thermoplastic olefin.

11. The metallized composite of claim 10, wherein the second thermoplastic layer includes polyvinylidene difluoride.

12. The metallized composite of claim 10, wherein the second thermoplastic layer includes thermoplastic polyurethane.

13. The metallized composite of claim 1, wherein the first thermoplastic layer includes polyvinyl chloride.

14. The metallized composite of claim 13, wherein the second thermoplastic layer includes thermoplastic polyurethane.

15. The metallized composite of claim 1, wherein the first thermoplastic layer includes thermoplastic polyurethane.

16. The metallized composite of claim 1, wherein said adhesive includes at least one component selected from the group consisting of styrene-butadiene copolymers, ethylvinyl acetates, polyesters, polyamides, acrylic pressure-sensitive adhesives, silicone pressure-sensitive adhesives, polyurethanes and isocyanate-crosslinked polymers.

17. The metallized composite of claim 16, wherein the adhesive is a thermally activated adhesive.

18. The metallized composite of claim 17, wherein the adhesive includes two components.

19. The metallized composite of claim 18, wherein the adhesive includes polyester and isocyanate.

20. The metallized composite of claim 18, wherein the adhesive includes polychloroprene and isocyanate.

21. The metallized composite of claim 18, wherein the adhesive includes polyurethane and isocyanate.

22. The metallized composite of claim 18, wherein the adhesive includes polyurethane and aziridine.

23. The metallized composite of claim 16, wherein the adhesive can be cured by exposure to ultraviolet light.

24. The metallized composite of claim 16, wherein the adhesive is an ultraviolet light-curable pressure-sensitive adhesives.

25. The metallized composite of claim 1, wherein said metal is indium.

26. The metallized composite of claim 1, wherein said metal is selected from the group consisting of zinc, tin, gallium, aluminum, cadmium, copper, nickel, cobalt, iron, stainless steel, gold, platinum, chromium, nichrome, palladium, and rhodium.

27. The metallized composite of claim 1, wherein at least one of said thermoplastic layers is tinted.

28. The metallized composite of claim 1, wherein the adhesive layer is tinted.

29. The metallized composite of claim 1, wherein at least one of said thermoplastic layers is tinted with a dye.

30. The metallized composite of claim 1, wherein either of said first or second thermoplastic layers includes carbon black.

31. The metallized composite of claim 1, wherein the first and second thermoplastic layers predominantly include different thermoplastic polymer components.

32. The metallized composite of claim 31, wherein said metal islands preferentially adhere to one of the two thermoplastic layers.

33. The thermoplastic composite of claim 1, wherein said composite is supported by a substrate.

34. The thermoplastic composite of claim 1, wherein said composite is folded.

35. The thermoplastic composite of claim 1, wherein said composite is embossed.

36. The thermoplastic composite of claim 1, wherein said composite is molded.

* * * * *

(12) INTER PARTES REVIEW CERTIFICATE (16th)
United States Patent    (10) Number:    US 6,455,138 K1
Murano    (45) Certificate Issued:    Jul. 14, 2014

(54) METALLIZED SHEETING, COMPOSITES, AND METHODS FOR THEIR FORMATION

(75) Inventor: Adam Murano

(73) Assignee: Textron Innovations Inc.

Trial Number:

IPR2013-00149 filed Feb. 15, 2013

Petitioner: Wavelock Advanced Technology Co., Ltd.

Patent Owner: Textron Innovations Inc

Inter Partes Review Certificate for:

Patent No.: 6,455,138
Issued:    Sep. 24, 2002
Appl. No.: 09/223,545
Filed:    Dec. 30, 1998

The results of IPR2013-00149 are reflected in this inter partes review certificate under 35 U.S.C. 318(b).

INTER PARTES REVIEW CERTIFICATE
U.S. Patent 6,455,138 K1
Trial No. IPR2013-00149
Certificate Issued Jul. 14, 2014

AS A RESULT OF THE INTER PARTES REVIEW PROCEEDING, IT HAS BEEN DETERMINED THAT:

Claims 1-3, 8, 10, 16-19, 21, 25-33, 35 and 36 are disclaimed.

\* \* \* \* \*